United States Patent Office 3,193,989
Patented July 13, 1965

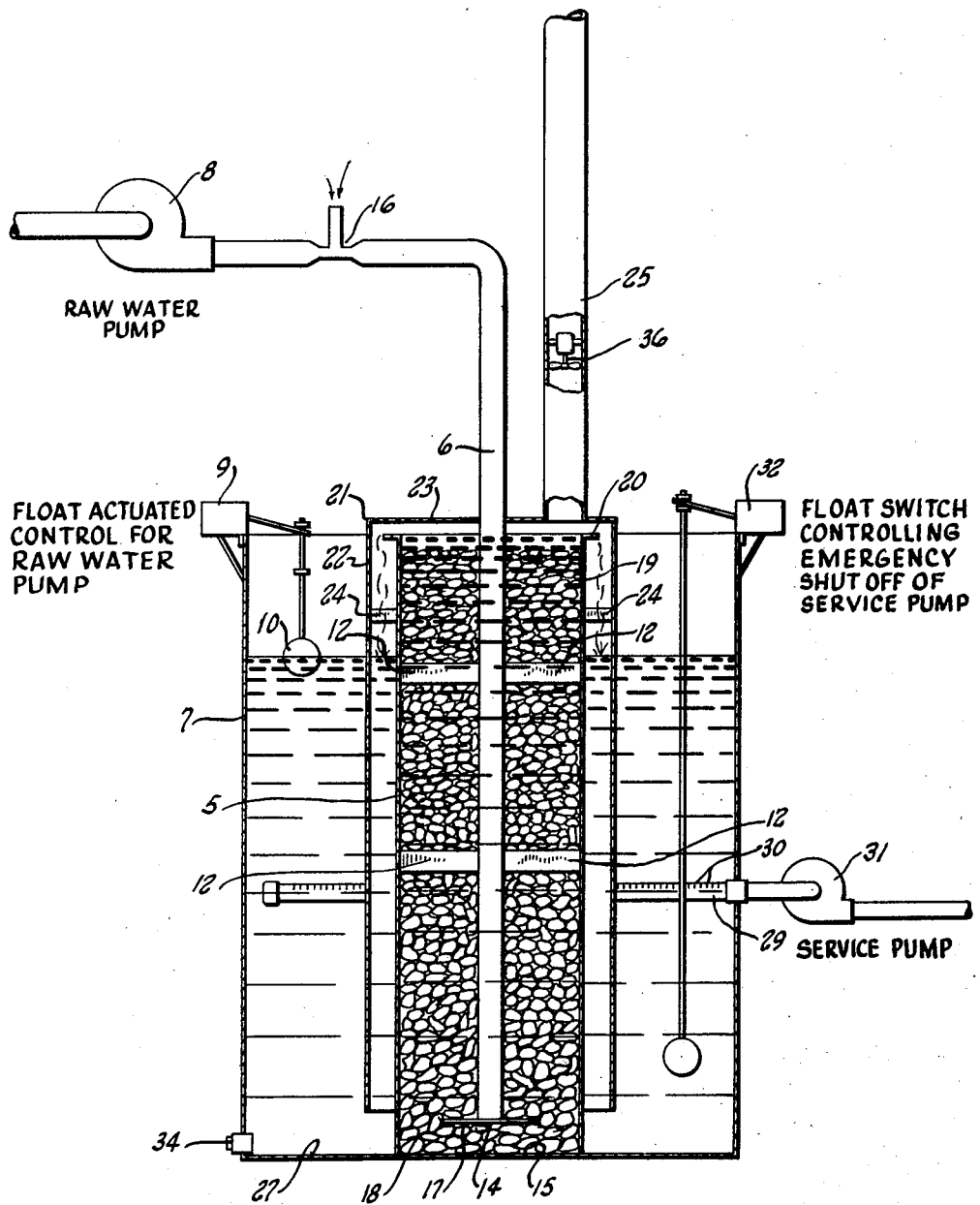

3,193,989
AERATING WATER TREATMENT APPARATUS
Flavius J. Sebeste, Milwaukee, Wis., assignor to Bruner Corporation, Milwaukee, Wis., a corporation of Wisconsin
Filed Feb. 23, 1962, Ser. No. 175,884
6 Claims. (Cl. 55—164)

This invention relates to apparatus for aerating and deaerating water to effect removal therefrom of certain gases and dissolved minerals, and refers more particularly to water aerating and deaerating apparatus suitable for residential as well as commercial and industrial installations.

The water of many residential and other supplies is objectionable because of the presence therein of hydrogen sulfide or carbon dioxide gases and/or dissolved iron or manganese. Hydrogen sulfide is objectionable in a water supply because of its characteristic and disagreeable rotten egg odor, and carbon dioxide forms an acid which causes the water to be corrosive. When water containing dissolved iron is exposed to air, the iron comes out of solution in the form of a fine reddish-brown sediment which clouds and colors the water and tends to coat the walls of its container. Under similar conditions dissolved manganese comes out of solution as a black sediment.

It is well known, however, that hydrogen sulfide and carbon dioxide can be released from water by aerating it, and that dissolved iron and manganese can be effectively removed from water by aeration of the water to oxidize the dissolved metal, followed by filtration or a period of quiescence during which the oxidized iron and manganese are allowed to settle out of the water.

Heretofore, aerating devices suitable for aerating water to free it from objectionable gases and to oxidize dissolved iron and manganese have either been inherently unsuitable for installation in a residence or have been too costly in operation for most residential purposes. Most such aerators had to be installed out of doors, not only because of their large size but also in order to provide for the venting of gases released from the water being treated, since it was not feasible to provide such devices with a ducted hood or the like by which released gases could be successfully conducted out of a building. Out-of-door aerator installations have always presented a problem during freezing weather, and special provisions have had to be made to prevent ice from interfering with operation of their pumps.

One type of aerator heretofore provided for indoor installation comprised a vented pressure tank into which water to be treated was introduced from above while compressed air was introduced from below. Although it was possible with such a counterflow aerator to provide a stack by which gases could be conducted away from the tank, the device was relatively expensive to operate because of its incorporation of an air pump; and it had the further economic disadvantage of requiring that a filter be associated with it where iron or manganese were present in the water, since it provided for no quiescent retention of the water to allow these materials to settle out. Such filters had to be cleaned at regular intervals and thus constituted a source of annoyance and possible difficulty when maintenance was overlooked.

With the foregoing in mind it is a general object of this invention to provide a water aerating and deaerating apparatus that incorporates a retention tank for precipitation of iron and manganese from aerated water so as to minimize filter maintenance or even obviate the necessity for filters for those materials, but which is nevertheless sufficiently compact and inexpensive, for residential installation and so low in operating costs as to be within the means of the ordinary household, such economy in operation being achieved by reason of the fact that the device requires no air pump for introducing air into water to be treated, no fan or blower for carrying away gases to be vented, and no water pumps other than one for bringing untreated water from a source to the device and another for circulating treated water from the device to a point of utilization.

Another and more specific object of this invention is to provide aerating and deaerating apparatus of the character described which incorporates a compact and efficient upright aerating or mixing vessel wherein air and water, which are together introduced into the vessel through an inlet near its bottom, are thoroughly mixed with one another in the course of upward flow to the top of the aerating vessel, and from which the water is caused to cascade into a retention tank to be deaerated and to release its gases.

Another object of this invention is to provide compact and efficient apparatus of the character described comprising an upright aerating and mixing vessel having an inlet for air and water near its bottom and an outlet at its top, a retention tank surrounding the mixing vessel and into which water cascades from the top of the mixing vessel, and a hood over the mixing vessel which collects gases released from the water as it cascades out of the mixing vessel and which cooperates with water in the retention tank to provide a seal that prevents the escape of such released gases and also serves as a baffle that prevents water cascading into the retention tank from roiling the water being held therein.

Still another object of this invention is to provide aerating and deaerating apparatus of the character described which employs an eductor for effecting preliminary mixing of air with water to be treated in the apparatus, and wherein the air and water are together passed upwardly through a bed of granular carbon material, such as anthracite, which is employed not only for its known catalytic value but also as a means for achieving thorough dispersal of fine air bubbles in the water and hence a complete mixing of the air with the water.

It is also an object of this invention to provide water treating apparatus of the character described wherein the eductive power of a flow control device is employed for initially introducing air into water to be treated, and wherein the air pumping effect of such eductor means is relied upon to obviate the necessity for a fan or blower by which released gases are forced outwardly through a vent stack.

With the above and other objects in view which will appear as the description proceeds, this invention resides in the novel construction, combination and arrangement of parts substantially as hereinafter described and more particularly defined by the appended claims, it being understood that such changes in the herein disclosed invention may be made as come within the scope of the claims.

The accompanying drawing illustrates one complete example of the physical embodiment of the invention constructed according to the best mode so far devised for the practical application of the principles thereof, and in which the single figure is a vertical section view of aerating and deaerating apparatus embodying the principles of this invention, which comprises, in general, an upright aerating or mixing vessel 5 that is preferably cylindrical, an inlet duct 6 which debouches into the aerating vessel near the bottom thereof and by which water to be treated is brought to the aerating vessel along with air, and a retention tank 7 which surrounds the aerating vessel and into which water cascades from the vessel.

Water to be treated in the apparatus is fed into the inlet duct 6 by means of a pump 8, which can be the usual well pump in cases where a well provides the water source. A float actuated control device 9, having its float actuator 10 in the retention tank, can comprise a switch connected with the pump 8 to turn the latter on and off as required to maintain the water in the retention tank between predetermined upper and lower levels. Those skilled in the art will understand that where the device of this invention is incorporated in an existing installation in which the well pump feeds into a pressure tank, the float actuated control device 9 can be used to control a solenoid valve (not shown) at the outlet of the pressure tank, where the pressure tank is connected to the inlet duct 6; or it could comprise a conventional float valve connected in the inlet duct 6. In any event the float actuated control 9 has either direct or indirect control over the well pump or other source pump to maintain water in the retention tank at the desired level.

Preferably the inlet duct 6 extends coaxially straight down into the mixing vessel 5, being held in place by spiders 12 or the like secured to the side wall of the vessel. Obviously it could extend into the mixing vessel from the bottom or the side thereof, but in any case its open end 14 in the mixing vessel provides the inlet to that vessel and is spaced a small distance above its bottom wall 15 in order to assure that water entering the vessel will have the greatest possible upward travel before it cascades over the upper edge of the vessel into the retention tank. Incorporated in a portion of the inlet duct which is outside the mixing vessel is an eductor 16 by which air is drawn into the water flowing to said vessel. It will be observed that the eductive power of water flowing in the inlet duct 6 is thus relied upon to force air into the mixing vessel, and therefore no air pump is required in the apparatus of this invention. It will also be noted that air and water are together introduced into the vessel through its inlet 14 and together move upwardly through substantially the entire height thereof before the water cascades over the upper edge of the vessel.

To prevent air introduced into the mixing vessel from rapidly bubbling to the top thereof along the outer surface of the inlet duct, the latter is provided at its bottom with a radially outwardly projecting circumferential flange 17. To further promote the intimate admixture of the air and water in the mixing vessel, it is filled with a bed 18 of granular material, preferably a carbon such as anthracite. As the incoming air and water rise through the granular bed 18, the large air bubbles issuing from the outlet of duct 6 are broken up and dispersed through the water. The efficacy of such upflow aerating through the granular bed 18 is demonstrated by the fact that fine bubbles continue to rise from the bed for several seconds after the pump 8 is turned off, and conversely, after a period of inactivity no air bubbles are seen to rise from the bed for several seconds after the pump is restarted, after which very fine bubbles rise through all portions of the water in the upper part of the vessel. In addition to its action in effecting thorough dispersion of air through the water, the granular bed 18 also has a known catalytic value when it is formed of a carbon material, as is preferred.

The outlet from the aerating or mixing vessel 5 is of course provided by the open top thereof. At its upper edge the cylindrical side wall 19 of the mixing vessel has an outturned lip or flange 20 across which water flows in leaving the vessel and which compels the water to fall freely into the retention tank 7 rather than following down along the outer surface of said wall. Obviously water in the retention tank is maintained at a level which is some distance below the top of the mixing vessel, and in falling through this distance the cascading water gives off any gases and undissolved air that it contains.

To catch and lead off the gases thus emitted, the apparatus includes an inverted cup-shaped hood 21, the side wall 22 of which coaxially surrounds the upper portion of the mixing vessel and the top wall 23 of which extends across the top of the vessel and is spaced above the same. The hood can be supported by radial spacers 24 or the like connected to its side wall 22 and to the side wall 19 of the mixing vessel. An upwardly extending vent stack 25 opens from the top wall of the hood and is adapted to carry the released gases to the out-of-doors through the roof or a wall of a building in which the apparatus is housed.

Attention is directed to the fact that the cylindrical side wall 22 of the hood extends downwardly into the retention tank to a level substantially below the normal low water level therein to provide a water seal that prevents the escape of gases from beneath the hood. Preferably the radial distance between the side wall 19 of the mixing vessel and the side wall 22 of the hood is relatively small, to prevent reabsorbtion of gases at the surface of the water in the retention tank beneath the hood.

If desired a suitable fan or blower 36 can be incorporated in the vent stack 25, but experience has shown this to be unnecessary under normal conditions. This is because the eductor, in effect, continuously pumps air into the mixing vessel so long as water is flowing in the inlet duct 6 and thus maintains an above-atmospheric pressure beneath the hood by which gases are forced upwardly through the vent stack. Where only carbon dioxide need be removed from water being treated, aeration of the water is not required if a sub-atmospheric pressure is maintained under the hood. In that case the fan 36 would function primarily as a vacuum pump for lowering pressure above the water, and the eductor 16 could be omitted. The mixing vessel and its bed of granular material would serve to agitate the water and thus facilitate release of the gas therefrom.

The retention tank is preferably substantially cylindrical and coaxial with the mixing vessel, and has its bottom wall 27 coplanar with the bottom wall 15 of the mixing vessel. The outlet from the retention tank comprises a draw-off pipe 29 which extends across a substantial portion of the tank intermediate the top and bottom thereof and which has inlet ports or apertures 30 at spaced intervals along its length. The draw-off pipe communicates with the inlet of a service pump 31 by which treated water is sent to a service system. Obviously the water can be passed through filters, a softener, or other water treating apparatus in the course of flow to the service system. A float switch 32, responsive to the level of water in the retention tank, can be connected with the service pump to prevent its operation when water in the retention tank falls to an excessively low level, and can also be connected with a suitable low level alarm.

The size of the retention tank is such, relative to the rate of flow of water through the apparatus, as to provide for a suitable period of retention (e.g., 30 minutes) of water that has been passed through the mixing vessel. When water containing iron and/or manganese is exposed to air, these dissolved solids form oxides which tend to precipitate, and the purpose of holding the water in the retention tank for this interval is to clear the water by allowing such precipitation to take place. The interval of quiescense provided by the retention tank also allows the water to be cleared of any minute bubbles of undissolved air that might be present therein and which would cause cloudy or white water.

Obviously any agitation of the water in the retention tank will interfere with the desired precipitation, and it will be observed in this respect that the side wall 22 of the hood not only provides a water seal, as pointed out above, but also extends downwardly into the retention tank a substantial distance below the normal low water level therein to serve as a baffle which tends to prevent water cascading out of the mixing vessel from roiling the main body of water in the retention tank. Roiling of the water in the retention tank is further prevented by the eductor 16, which preferably incorporates a flow controller of known type as its restriction, and which thus effects such regulation of the rate at which untreated water is fed into the mixing vessel as to prevent a substantially high volume cascade into the retention tank.

If the interval of quiescence provided by the retention tank is long enough, relative to the quantities of iron and manganese present in the water, no filters for these materials are required in the system. Alternatively the size of the retention tank can be reduced and a filter can be used, in which case the provision of the retention tank minimizes maintenance of the filter. Where neither iron nor manganese is present in appreciable quantities in the water supply the size of the retention tank can of course be substantially reduced, to the point where it merely comprises a downwardly extension of the side wall of the hood.

The draw-off pipe 29 should of course be spaced above the bottom wall 27 of the retention tank to prevent precipitated iron and/or manganese from being drawn off with the water being circulated to the service system, but it will also be obvious that the draw-off should be spaced a substantial distance below the normal low level of water in the tank. The retention tank should also be provided with a clean out drain 34 adjacent to its bottom to facilitate removal of precipitated iron and manganese compounds and other sediment.

From the foregoing description taken together with the accompanying drawing, it will be apparent that this invention provides an unusually compact and efficient water aerating and deaerating apparatus, small enough to be suitable for indoor residential installation, and which embodies means for conducting to the out-of-doors the gases released from water being treated. It will also be apparent that the water treating apparatus of this invention is further well suited for residential and other installations by reason of its low initial cost and its economical and efficient operation, there being no need for an air pump, a fan or blower for venting released gases, or, in many cases, filters for removing oxidized iron and manganese from water treated by means of the apparatus.

What is claimed as my invention is:

1. Aerating water treatment apparatus of the character described, comprising:
    (A) means defining a retention tank having side walls extending upwardly from its bottom and having an outlet near its bottom but spaced thereabove, said retention tank being adapted to hold a quantity of water which may be withdrawn through said outlet;
    (B) means defining an upright mixing vessel in the retention tank having a closed bottom, an outlet at its top, and side walls spaced inwardly from the side walls of the retention tank;
    (C) means providing an untreated water inlet port positioned to debouch into said mixing vessel at a level near to but spaced above the bottom thereof and through which untreated water may enter the mixing vessel to rise therein and be discharged at the top of the vessel;
    (D) duct means for conducting untreated water to said inlet port;
    (E) means operatively associated with said duct means for introducing air into untreated water being conducted to the inlet port by said duct means;
    (F) a bed of granular material in the mixing vessel, extending upwardly to a level substantially above the inlet port, for thoroughly mixing air and water introduced into the mixing vessel through the inlet port in the course of their circulation upwardly to the top of the mixing vessel; and
    (G) a hood having
        (1) sidewalls that surround and are spaced outwardly from the side walls of the mixing vessel and which extend downwardly into the retention tank to be immersed in water held in the retention tank to a depth spaced above the bottom of the retention tank so as to provide a water seal,
        (2) and having a top wall that extends across and is spaced above the top of the mixing vessel and in which there is an outlet connectable with a stack by which gases can be carried away from beneath the hood.

2. The water treatment apparatus of claim 1, further characterized by the fact that said means for introducing air into untreated water comprises an eductor in said duct means for conducting untreated water to the inlet port.

3. In aerating water treatment apparatus of the character described:
    (A) means defining an upright mixing vessel closed at the bottom and having an outlet opening at its top;
    (B) an untreated water inlet duct having an outlet positioned to debouch into the mixing vessel near the bottom thereof;
    (C) a bed of granular material in said vessel, extending upwardly a substantial distance above the outlet of said duct so that untreated water entering the mixing vessel through said duct is constrained to flow upwardly to the top of the vessel through the bed to reach the outlet opening of the vessel;
    (D) means operatively associated with said inlet duct for introducing air thereinto, so that such air becomes initimately mixed with water in the mixing vessel as the air and water flow upwardly through said bed of granular material therein;
    (E) means defining a tank adjacent to the mixing vessel and having a portion spaced beneath and in communication with the outlet opening at the top of the mixing vessel so that water can cascade into said tank from said outlet opening and in so doing be freed of gases and undissolved air;
    (F) a hood enclosing the upper portion of the mixing vessel to receive such gases and dissolved air, said hood having top and side walls the latter extending down alongside and embracing the side of the mixing vessel for a substantial part of its height;
    (G) means providing a water seal between the side wall of the hood and the exterior of the mixing vessel; and
    (H) vent means connected with the upper portion of the hood for withdrawing gases from the hood.

4. The water treatment apparatus of claim 1, further characterized by the fact that the outlet of the mixing vessel comprises a radially outwardly projecting lip at the top of the mixing vessel across which water leaving the vessel can flow, and by which such water is caused to cascade out of contact with the outer surface of the mixing vessel, to provide for deaerating and degassifying the water.

5. Aerating water treatment apparatus of the character described comprising:
    (A) an open topped retention tank having an outlet near to but spaced above its bottom;
    (B) an upright mixing vessel having
        (1) a closed bottom
        (2) an inlet near its bottom and
        (3) a laterally outwardly projecting outlet spaced above its inlet and which overhangs the open top of the retention tank so that water leaving the outlet flows into the retention tank;
    (C) means comprising a duct for conducting untreated water to said inlet of the mixing vessel;
    (D) means operatively associated with said duct for introducing air into untreated water flowing therein;
    (E) a bed of granular material in the mixing vessel, extending upwardly a substantial distance above its inlet, by which air and water entering the vessel by said inlet are intimately mixed in the course of upward flow to the outlet of the mixing vessel;
(F) means responsive to the level of water in the retention tank for so controlling the flow of untreated water in said duct as to maintain water in the retention tank at a level spaced below the outlet of the mixing vessel, so that water must cascade into the retention tank from the mixing vessel outlet to be thus deaerated and degassed; and
(G) a hood covering the outlet of the mixing vessel in spaced relation thereto for collecting gases released from water as it cascades into the retention tank, said hood having a side wall which extends down into the retention tank to be immersed in water therein and thereby prevent water in the retention tank from being roiled by water cascading into it.

6. Apparatus for removing gas from water comprising:
(A) an upright vessel having a closed bottom, an inlet near its bottom and an outlet spaced a substantial distance above the inlet;
(B) a bed of granular material in the vessel extending upwardly a substantial distance from the inlet, so that water flowing upwardly through the vessel from the inlet to the outlet must pass through said bed to be agitated thereby;
(C) an open-topped retention tank having an outlet near its bottom but spaced thereabove, said retention tank being adapted to hold a quantity of water which may be withdrawn through said outlet and being so located beneath the vessel outlet that water issuing from the vessel outlet can cascade into the retention tank;
(D) a hood covering the upper portion of the vessel in spaced relation thereto and encompassing the vessel outlet for collecting gas released from cascading water, said hood having a side wall which extends down into the retention tank to be immersed in water therein to cooperate with the water in providing a seal for the hood; and
(E) means for drawing gas from under the hood to create a subatmospheric pressurse therebeneath.

References Cited by the Examiner
UNITED STATES PATENTS

| | | | |
|---|---|---|---|
| 762,466 | 6/04 | Church et al. | 210—17 |
| 1,063,900 | 6/13 | Whitacre | 55—234 |
| 1,353,571 | 9/20 | Dreibrodt | 148—1.6 |
| 1,991,896 | 2/35 | Hays | 210—17 |
| 2,078,288 | 4/37 | Sherman | 55—54 |
| 2,283,166 | 5/42 | Buell et al. | 210—17 |
| 2,366,945 | 1/45 | Walker | 55—38 X |
| 2,522,005 | 9/50 | Whitlock et al. | 55—41 |
| 2,785,962 | 3/57 | Ruth | 23—284 |
| 2,962,863 | 12/60 | Caroli | 55—190 X |
| 2,998,096 | 4/61 | Snipes | 55—166 |
| 3,019,185 | 1/62 | Fouilland et al. | 210—109 X |
| 3,073,454 | 1/63 | Waterman et al. | 210—256 |
| 3,132,012 | 5/64 | Walker | 55—48 |

FOREIGN PATENTS 949,696  9/56  Germany.

REUBEN FRIEDMAN, *Primary Examiner.*
HARRY B. THORNTON, *Examiner.*